United States Patent
Takeda et al.

(10) Patent No.: US 7,978,301 B2
(45) Date of Patent: Jul. 12, 2011

(54) OPTICALLY ISOTROPIC LIQUID CRYSTAL DISPLAY DEVICE WITH INTERDIGITALLY FORMED PIXEL AND COMMON ELECTRODES

(75) Inventors: Shintaro Takeda, Hitachi (JP); Osamu Itou, Hitachi (JP); Masaki Matsumori, Naka (JP)

(73) Assignee: Hitachi Displays, Ltd., Chiba (JP)

( * ) Notice: Subject to any disclaimer, the term of this patent is extended or adjusted under 35 U.S.C. 154(b) by 252 days.

(21) Appl. No.: 11/774,763

(22) Filed: Jul. 9, 2007

(65) Prior Publication Data

US 2008/0007666 A1      Jan. 10, 2008

(30) Foreign Application Priority Data

Jul. 7, 2006   (JP) .................. 2006-187345

(51) Int. Cl.
*G02F 1/1343* (2006.01)
*C09K 19/02* (2006.01)

(52) U.S. Cl. ........................ 349/168; 349/141
(58) Field of Classification Search .................. 349/141, 349/168
See application file for complete search history.

(56) References Cited

U.S. PATENT DOCUMENTS

| | | | |
|---|---|---|---|
| 6,266,109 B1* | 7/2001 | Yamaguchi et al. | 349/86 |
| 2002/0041354 A1 | 4/2002 | Noh | |
| 2002/0047974 A1 | 4/2002 | Matsumoto | |
| 2003/0043098 A1 | 3/2003 | Aoyama et al. | |
| 2004/0066480 A1* | 4/2004 | Yoshida et al. | 349/123 |
| 2004/0119071 A1* | 6/2004 | Takahara | 257/59 |
| 2005/0057715 A1* | 3/2005 | Hashimoto | 349/125 |
| 2005/0088598 A1* | 4/2005 | Matsumori et al. | 349/139 |
| 2005/0094072 A1* | 5/2005 | Lu et al. | 349/123 |
| 2005/0105033 A1 | 5/2005 | Itou et al. | |
| 2005/0151912 A1* | 7/2005 | Miyachi et al. | 349/141 |

(Continued)

FOREIGN PATENT DOCUMENTS

JP      11-183937      7/1999

(Continued)

OTHER PUBLICATIONS

Chien et al, "Liquid:Crystalline Behavior of 4-(W-Aminoalkyloxy)-4'-Cyanobiphenyls And Their Side Chain Epoxy Polymers" Liquid Crystals, Taylor and Francis, Abingdon, GB, vol. 12, No. 5, Nov. 1, 1992 pp. 853-861.

(Continued)

*Primary Examiner* — Mark A Robinson
*Assistant Examiner* — Michael Inadomi
(74) *Attorney, Agent, or Firm* — Antonelli, Terry, Stout & Kraus, LLP.

(57) ABSTRACT

A liquid crystal display device is provided with an electrode structure for effective utilization of optically isotropic liquid crystals. Such a liquid crystal display device comprises a first substrate; a second substrate; polarizing plates provided on the first substrate and the second substrate, respectively; a liquid crystal layer disposed between the first substrate and the second substrate; and pixel electrodes and common electrodes provided on the first substrate, wherein the liquid crystal layer has such a property that optical anisotropy is induced therein by a change of an optically isotropic state caused by a voltage; wherein ones of the pixel electrodes and the common electrodes are formed in an inter-digital form, while the other ones are formed in a flat plate, and wherein an electric field is applied to the liquid crystal layer by a potential difference between the pixel electrodes and the common electrodes.

11 Claims, 10 Drawing Sheets

U.S. PATENT DOCUMENTS

| | | | |
|---|---|---|---|
| 2005/0179632 A1* | 8/2005 | Miyachi et al. | 345/87 |
| 2007/0070282 A1* | 3/2007 | Shibahara et al. | 349/141 |
| 2009/0027603 A1* | 1/2009 | Samulski et al. | 349/124 |

FOREIGN PATENT DOCUMENTS

| | | |
|---|---|---|
| JP | 2001-249363 | 9/2001 |
| JP | 2003-327966 | 11/2003 |
| JP | 2005-338388 | 12/2005 |
| JP | 2006-003840 | 1/2006 |
| JP | 2006-30613 | 2/2006 |
| KR | 2001-58183 | 7/2001 |
| KR | 2001-58184 | 7/2001 |
| KR | 2002-2668 | 1/2002 |
| KR | 2002-0028477 | 4/2002 |
| KR | 2002-41426 | 6/2002 |
| KR | 2002-77008 | 10/2002 |
| WO | WO 2005/075603 | 8/2005 |
| WO | WO 2005-090520 | 9/2005 |
| WO | WO2005/098523 | 10/2005 |

OTHER PUBLICATIONS

Cada et al, "Anisotropic Binders For Polymer/Liquid Crystal Dispersions", Macromolecular Chemistry and Physics, Wiley-VCH Verlag, Weinheim, DE vol. 195, No. 5, May 1, 1994 (pp. 1733-1739).

"Control of the LC Alignment Using A Stamped Morphology Method And Its Application to LCD's", Lee et al, SID International Symposium—Digest Of Technical Papers, Seattle, May 16-21, 1993, Playa Del Rey, Sid, US, vol. Part 1, vol. 24 (May 16, 1993) pp. 957-960.

Office Action issued in Korean Patent Application No. 2007-67939 on Apr. 10, 2008.

Office Action issued in Korean Patent Application No. 2007-67939 on Nov. 27, 2008.

W. H. De Jeu; Properties of Liquid Crystal, pp. 90-94, published 1991.

Harry J. Coles, et al.; Liquid crystal "blue phase" with a wide temperature range; Nature Publishing Group; Aug. 18, 2005; pp. 997-1000; vol. 436.

Atsushi Yoshizawa, et al.; A blue phase observed for a novel chiral compound possessing molecular biaxiality; The Royal Society of Chemistry; Jul. 11, 2005; pp. 3285-3290; vol. 15.

Bharat R. Acharya, et al.; The Bent-Core Biaxial Nematic Phase; Liquid Crystals Today; Mar. 2004; pp. 1-4; vol. 13, No. 1.

Yoshiaki Hisakado, et al.; Large Electro-optic Kerr Effect in Polymer-Stabilized Liquid-Crystalline Blue Phases; Advanced Materials; Jan. 6, 2005; pp. 96-98; vol. 17; No. 1.

Yoshio Shimbo; et al.; Ideal Liquid Crystal Display Mode Using Achiral Banana-Shaped Liquid Crystals; The Japanese Journal of Applied Physics; 2006; pp. L282-L284; vol. 45; No. 10.

M. Manai, et al.; Optic and electro-optic investigations on SmQ, SmC*A and L phases in highly chiral compounds; Physical B; vol. 368; 2005; pp. 168-178.

* cited by examiner

OPTICALLY ISOTROPIC LIQUID CRYSTAL DISPLAY DEVICE WITH INTERDIGITALLY FORMED PIXEL AND COMMON ELECTRODES

BACKGROUND OF THE INVENTION

The present invention relates to the production of optically isotropic liquid crystal materials and the structures of a liquid crystal display panel and a liquid crystal display device which use the liquid crystal materials.

Owing to the recent advance in techniques for producing a liquid crystal panel, liquid crystal display elements have come to be used in a display for television though Braun tubes have heretofore been mainly used therein. As to the liquid crystal display elements, twisted nematic (TN) display method has heretofore been known but has been required to be improved in contrast, view angle characteristics and response characteristics. Particularly when the liquid crystal display elements are used in televisions, they are greatly inferior to Braun tubes in the characteristic described above. Therefore, there has been a desire for the improvement of these characteristics. As a display method for the liquid crystal display elements for improving the above-mentioned contrast and view angle characteristics, there are known, for example, in-plane switching (transverse electric field) display method (hereinafter referred to as "IPS method") and multi-domain vertical alignment display method (hereinafter referred to as "VA method"). These methods permit great improvement in view angle and contrast as compared with TN method.

However, in IPS and VA methods, a liquid crystal layer is an optically uniaxial medium, so that its transmittance becomes dependent on view angle when the liquid crystal layer is used as it is. In addition, as described in the non-patent document 1 described hereinafter, nematic liquid crystal materials shows light scattering caused by the thermal perturbation of molecules. In IPS and VA methods, since a black display is given when no voltage is applied, a lowering of contrast by light leakage due to the light scattering is unavoidable in principle even in the case of the black display. Problems including such optical anisotropy and light scattering are inherent in display devices using a nematic liquid crystal material.

On the other hand, in recent years, there have been known materials of liquid crystals having isotropy optically and three-dimensionally or two-dimensionally (hereinafter referred to as "optically isotropic liquid crystals"). The optically isotropic liquid crystals have the following property: the alignment of liquid crystal molecules in a liquid crystal layer is optically and three-dimensionally or two-dimensionally isotropic when no voltage is applied to the liquid crystal layer, and by the application of a voltage, birefringence is induced in the direction of application of the voltage. In the case of materials of optically isotropic liquid crystals reported in recent years, the following phases and molecules are optically isotropic. As phases having optical isotropy three-dimensionally, there are a smectic blue phase and a cholesteric blue phase. As molecules having optical isotropy two-dimensionally, there are bent core molecules. The bent core molecules are molecules of a liquid crystal compound subjected to vertical alignment with respect to a substrate and have optical isotropy in a plane of a liquid crystal layer when no voltage is applied. In addition to them, a cubic phase, a smectic Q phase, a micelle phase, a reverse micelle phase, a sponge phase, etc. are known as phases having optical isotropy.

The following non-patent document 2 and non-patent document 3 describe the extension of the temperature range of a blue phase which has been difficult to put to practical use in a device because of its very narrow temperature range. The following non-patent document 4 describes materials of optically isotropic liquid crystals and their properties, such as the optical biaxiality of bent core molecules. The following non-patent document 5 and non-patent document 6 describe display devices using optically isotropic liquid crystals. The following non-patent document 7 describes an electric field strength necessary to optically isotropic liquid crystals.

In addition, the following patent document 1 discloses specifically the electrode structure of a liquid crystal panel using optically isotropic liquid crystals, etc.

Patent Document 1: JP-A-2006-3840

Non-patent document 1: W. H. de Jew, "Properties of Liquid Crystal", translated by Tsutomu Ishii and Shunsuke Kobayashi, pp. 90-94

Non-patent document 2: Harry J. Coles, Nature, Vol. 436, pp. 997-1000

Non-patent document 3: Atsushi Yoshizawa, et al., Journal of Materials Chemistry, Vol. 15, pp. 3285-3290, 2005

Non-patent document 4: Bharat R. Acharya et al. LIQUID CRYSTALS TODAY, VOL. 13, No. 1, 1-4, 2004

Non-patent document 5: Hiroshi Kikuchi, Advanced Materials, Vol. 17, pp. 96-98, 2005

Non-patent document 6: Hideo Takezoe et al., Japanese Journal of Applied Physics, Vol. 45, L pp. 282-284, 2006

Non-patent document 7: Physica B, Vol. 368, pp. 168-178, 2005

As described above, the properties of optically isotropic liquid crystals have been elucidated which are different from those of conventional liquid crystals, but the structure of a device using such a liquid crystal material has not sufficiently been investigated.

SUMMARY OF THE INVENTION

The present invention is intended to attain an electrode structure and a pixel design which are the most suitable for effective utilization of optically isotropic liquid crystals in a device.

The present invention is accomplished, for example, by the following means.

The present invention employs a structure of liquid crystal display device comprising a first substrate, a second substrate, polarizing plates provided on the first substrate and the second substrate, respectively, a liquid crystal layer located between the first substrate and the second substrate, and pixel electrodes and common electrodes, which are provided on the first substrate, wherein the liquid crystal layer has such a property that optical anisotropy is induced therein by a change of an optically isotropic state caused by application of a voltage; either the pixel electrodes or the common electrodes are formed in an interdigital form; and an electric field is applied to the liquid crystal layer by a potential difference made between the pixel electrodes and the common electrodes. The present invention also employs a structure of liquid crystal display device in which said first substrate has a plurality of pixels located thereon in the form of a matrix, and said pixel electrodes, said common electrode and a thin-film transistor are located in each of the plurality of the pixels. The present invention further employs a structure of liquid crystal display device in which said first substrate has a passivation layer, and the passivation layer is located between said liquid crystal layer and the nearest electrode to said liquid crystal layer among the electrodes located on said first substrate. The present invention still further employs a structure of liquid crystal display device in which a surface layer is located on said first substrate; the surface layer is located in contact with the surface of said liquid crystal layer; and the surface layer has a periodic structure of 400 nm or less in size. The present invention still further employs a structure of liquid crystal display device in which said pixel electrodes are formed in interdigital forms; said common electrodes are formed in the form of a flat plate; and said pixel electrodes have two interdigital forms, which are different in direction by not more than 92° and not less than 88°, in each of the plurality of said pixels. The present invention still further employs a structure of liquid crystal display device in which said liquid crystal layer is obtained by heat-crosslinking reaction.

Employment of the present invention makes it possible to attain a liquid crystal display panel and a liquid crystal display device, which use optically isotropic liquid crystals and are of high quality.

Other objects, features and advantages of the invention will become apparent from the following description of the embodiments of the invention taken in conjunction with the accompanying drawings.

DESCRIPTION OF REFERENCE NUMERALS

PX - - - pixel electrode, CT - - - common electrode, CL - - - common signal line, GL - - - gate signal line, TFT - - - thin-film transistor, DL - - - image signal line, CF - - - color filter, BM - - - black-matrix, SUB1, SUB2 - - - substrate, PL1, PL2 - - - polarizing plate, GI - - - gate insulator, PAS1, PAS2 - - - passivation layer, EL - - - electric field, LC - - - liquid crystal layer, SL - - - surface layer, MO - - - mold, DI - - - defective portion, UL - - - irradiation light, S - - - slit, UV - - - ultraviolet light, PO - - - polyimide resin thin film.

DETAILED DESCRIPTION OF THE INVENTION

Structures suitable for optically isotropic liquid crystals are explained below in sequence.
[Basic Structure of a Device]

At first, a basic device structure in the case of using optically isotropic liquid crystals is explained.

In a liquid crystal display device, an electric field is formed between pixel electrodes and common electrodes, which are located on one of the substrates holding liquid crystals between them, and the optical characteristics of a layer of the liquid crystals are controlled by varying the electric field strength. In this case, the optically isotropic liquid crystals are optically isotropic when no voltage is applied, and induce birefringence in the direction of application of a voltage when the voltage is applied. Because of this property, in order to control the transmittance of the optically isotropic liquid crystals, it is necessary to locate upper and lower polarizing plates in a cross Nicol manner and apply an electric field in the in-plane direction (lateral direction) with respect to a liquid crystal panel. Therefore, an electrode structure according to IPS method is basically suitable for a liquid crystal display panel using optically isotropic liquid crystals.

Next, in the case of nematic liquid crystal conventionally used in IPS method, a display can be given by applying an electric field strength of about several volts/μm to a liquid crystal layer. On the other hand, as described in the above-mentioned non-patent document 7, a strong electric field of tens volts/μm or more has to be applied in the case of optically isotropic liquid crystals. Therefore, in order to give a satisfactory display by the use of optically isotropic liquid crystals, it is usually necessary to employ a structure of element which forms a stronger electric field and is obtained by the improvement of an electrode structure according to IPS.

Figure 1:
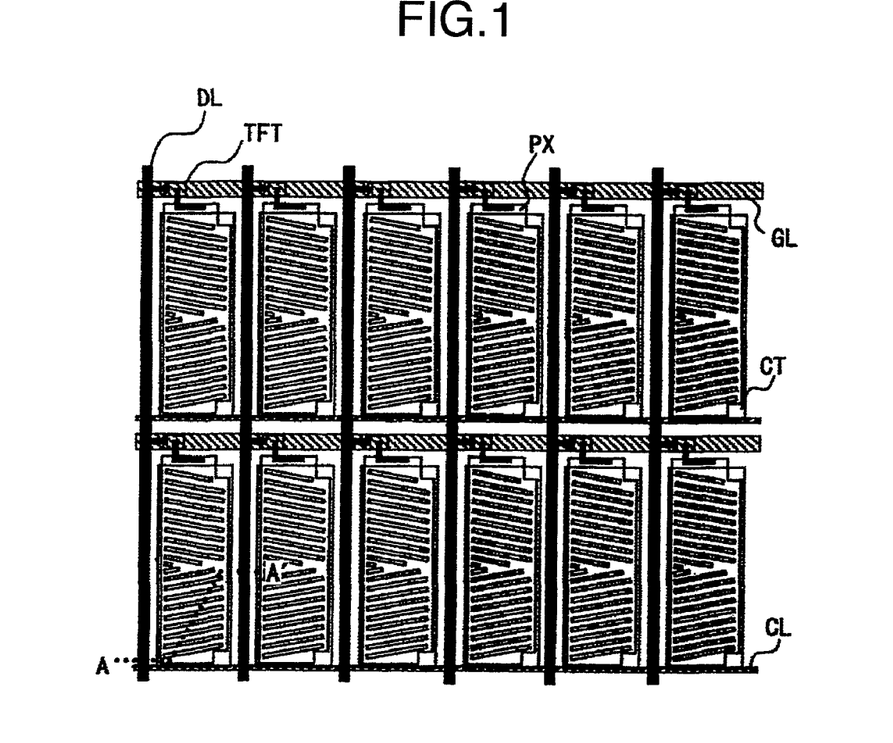
FIG. 1 is a diagram showing [the basic structure of a device] according to the present invention.
Figure 2:
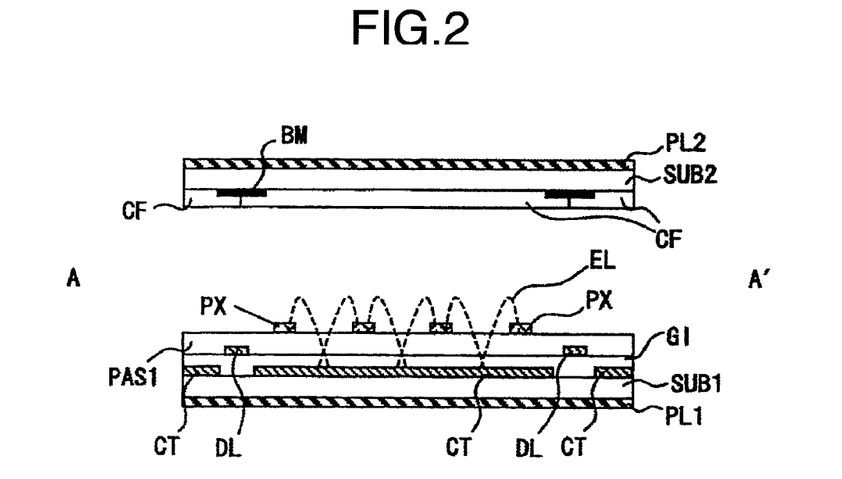
FIG. 2 is another diagram showing [the basic structure of the device] according to the present invention.

FIG. 1 and FIG. 2 show a device structure suitable for optically isotropic liquid crystals from such a point of view.

FIG. 1 shows an example of the organization of a group of pixels in display elements. An image signal transmitted by an image signal line DL is supplied to a pixel electrode PX through a thin-film transistor TFT controlled by a gate signal line GL. A display is given by forming an electric field between the pixel electrode PX and a common electrode CT to drive a liquid crystal layer.

FIG. 2 is a sectional view taken along the line A-A' of FIG. 1. A black-matrix BM is located on an upper substrate SUB2 having color filters CF, to prevent unnecessary light leakage. The colors of the color filters CF are different for different pixels adjacent to each other in the lateral direction because these pixels are for different colors. On the other hand, a lower substrate SUB1 has common electrodes CT formed thereon in the form of a flat plate in pixels, respectively. A gate insulator GI is provided on the common electrodes CT, and the image signal lines DL are provided so as to correspond to portions each between the common electrodes CT located in the pixels, respectively. In addition, a passivation layer PAS is provided on the image signal lines, and the pixel electrodes PX are located on the passivation layer PAS. The common electrode CT is formed of a transparent electrode such as ITO in the case of an element for display by transmission. When the common electrode CT is used for reflection, a metal layer is used as the common electrode CT. The pixel electrode PX is formed on the passivation layer PAS and is formed of a transparent electrode such as ITO in the case of an element for display by transmission. A pair of the substrates, i.e., the substrate SUB1 and substrate SUB2 have a polarizing plate PL1 and a polarizing plate PL2, respectively, and the polarizing plate PL1 and the polarizing plate PL2 are located so that their axes of absorption (their axes of transmission) may cross each other in a cross Nicol manner. Owing to such a structure, when no voltage is applied, the liquid crystal layer is optically isotropic, so that a black display is given. When a voltage is applied, birefringence is induced in the direction of application of the voltage, so that a white display is given. Two-dimensionally optically isotropic liquid crystals having bent core molecules have longitudinal alignment with respect to the substrates as initial alignment. On the other hand, since three-dimensionally optically isotropic liquid crystals have no initial alignment, they do not require the location of an alignment layer on each side of the liquid crystal layer.

In the pixel structure shown in FIG. 1 and FIG. 2, the pixel electrodes PX and the common electrodes CT are located on the lower substrate SUB1, and an electric field EL having a transverse component can be applied to the liquid crystal layer by a potential difference between the pixel electrodes PX and the common electrodes CT. In this case, the pixel electrodes PX are formed in an interdigital form (in the form of fingers) and the common electrodes CT are formed in the form of a flat plate (a plane). In FIG. 2 showing the sectional view, the pixel electrodes PX have many linear portions and a region between the adjacent linear portions is a region where the common electrode CT is exposed between the pixel electrodes PX. Thus, the electric field EL starting from the pixel electrodes PX and terminating at the common electrode CT is formed, and an image can be displayed by driving liquid crystal molecules in the liquid crystal layer by means of this electric field. By using such an electrode structure, the distance in the electric field between the pixel electrodes and the common electrode can be reduced in general as compared with an electrode structure that is such that both the pixel electrodes and the common electrode are formed in an interdigital form. As described above, although optically isotropic liquid crystals require a stronger electric field than do conventional nematic liquid crystals, the former electrode structure makes it possible to strengthen an electric field at the same applied voltage, so that the control of optically isotropic liquid crystals becomes possible.

Figure 25:
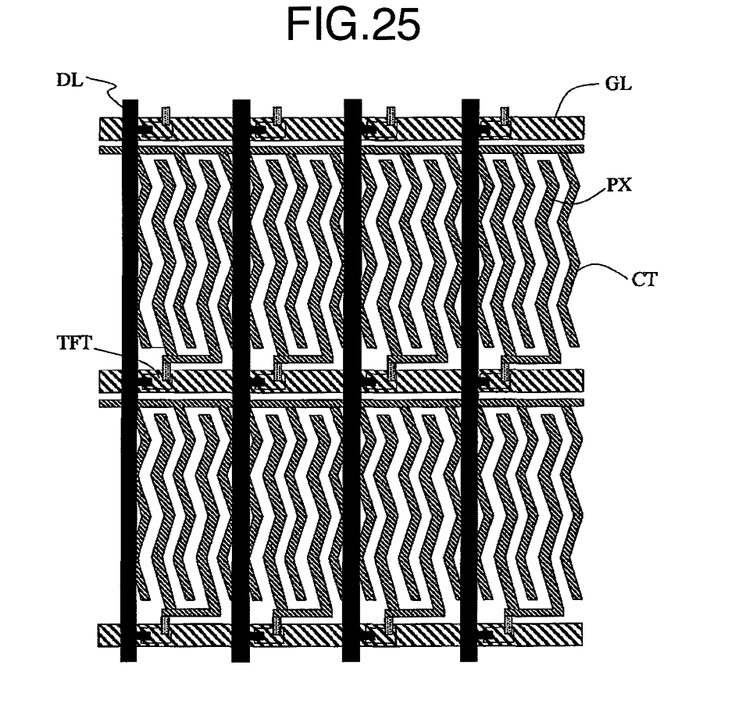
FIGS. 25 and 26 are diagrams showing another embodiment of the present invention.
Figure 26:
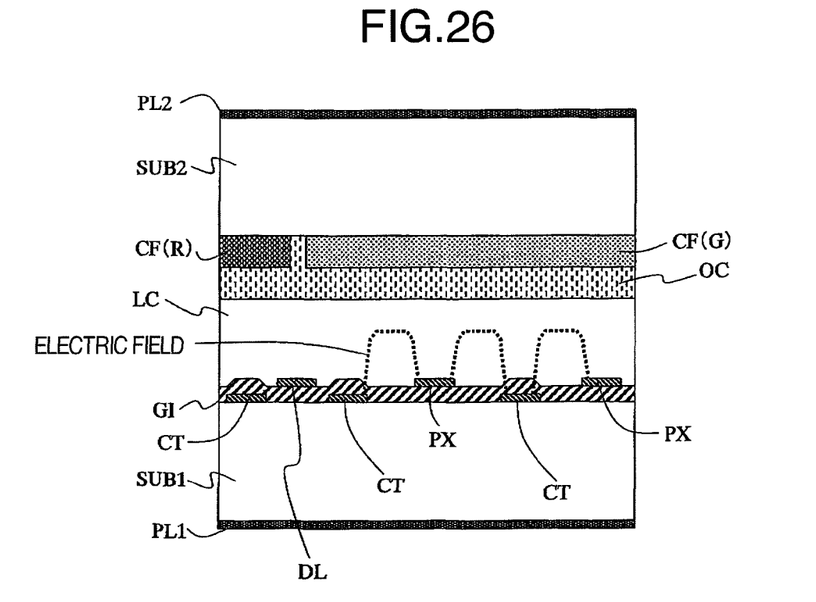

As described above, in the present invention, either of the pixel electrodes PX and the common electrodes CT are formed in an interdigital form. The common electrodes CT may be formed in the form of a flat plate, and as shown in FIGS. 25 and 26, both of the pixel electrodes PX and the common electrodes CT may be formed in interdigital forms.

When both of the pixel electrodes PX and the common electrodes CT may be formed in interdigital forms, there uniformly occurs an electric field approximately perpendicular to the pixel electrodes PX and the common electrodes CT. This is advantageous for driving a liquid crystals uniform in a pixel independent upon distance between pixel electrodes PX and common electrodes CT. In order to form a strong electric field, the distance between the pixel electrodes PX and the common electrodes CT is preferably short.

Even in case of the above-mentioned structure, an extremely strong electric field is applied to the liquid crystal layer in the same manner as in FIGS. 1 and 2, so that the problems to be solved stated above still remain.

That is, even in case of the above-mentioned structure, in order to solve the above-stated problems, it is essential to adopt the invention described below.

[Formation of a Passivation Layer]

The above-mentioned structure permits application of a strong electric field to optically isotropic liquid crystals. However, when three-dimensionally optically isotropic liquid crystals are used, alignment layers become unnecessary, so that the outermost electrodes come into direct contact with the liquid crystal layer. In the case of such a structure, when a strong electric field is applied to the liquid crystal layer, impurities in the liquid crystals are present preferentially at the boundary surface between the electrodes and the liquid crystals, so that a decrease in the stabilization rate and display troubles such as flicker of transmitted light are liable to be caused.

Figure 3:
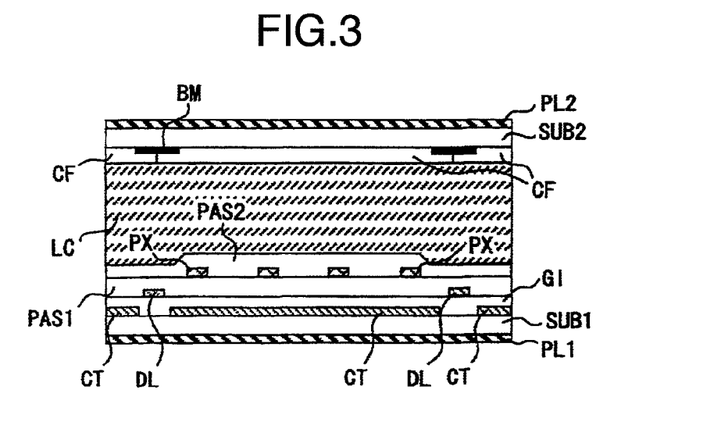
FIG. 3 is a diagram showing [the formation of a passivation layer] according to the present invention.

In order to solve this problem, the structure shown in FIG. 3 is employed in the present investigation. The structure shown in FIG. 3 is the same as that shown in FIG. 2 in that a liquid crystal layer LC is located between a substrate SUB2 having color filters CF and a substrate SUB1 having pixel electrodes PX and common electrodes CT. On the other hand, the structure shown in FIG. 3 is different from that shown in FIG. 2 in that a passivation layer PAS2 is provided between the pixel electrodes PX and the liquid crystal layer LC. This investigation is explained below in detail.

A 0.7-mm thick glass substrate having a polished surface was used as each of the substrates SUB1 and SUB2. On the substrate SUB1, thin-film transistors were formed and pixel electrodes PX, common electrodes CT and image signal lines DL were located. The pixel electrodes PX and the common electrodes CT were formed by patterning ITO. A gate insulator GI was made of silicon nitride and had a thickness of 0.3 µm. As in the above item [Basic structure of a device], the pixel electrodes PX were patterned in an interdigital form and the distance between the slits of the pattern was adjusted to 5 µm. In the formation of the pixel electrodes PX, an electrode thin film having an electrode thickness (x) of about 70 nm was formed. Such pixels were constructed in array from signal electrodes in a number of 1024×3 (corresponding to R, G and B) and 768 scanning electrodes to form an active-matrix substrate having pixels in a number of 1024×3×768. Similarly, a columnar spacer was formed of a resin by photolithography and etching treatment on the surface of the other substrate SUB1 having the color filters CF formed thereon.

Then, a passivation layer PAS2 was formed of silicon nitride in a thickness of 250 nm by CVD on the surface of the substrate SUB1 having the pixel electrodes PX formed thereon, between the two substrates SUB1 and SUB2. The passivation layer PAS2 can be formed of another inorganic or organic layer. The passivation layer PAS2 has to have such a thickness that it can prevent continuity between the pixel electrodes PX and the liquid crystals. A pair of the substrates SUB1 and SUB2 thus produced were placed facing each other and the periphery of the resulting assembly was coated with a sealer to construct a liquid crystal cell. As a material for the liquid crystal layer LC to be enclosed in the liquid crystal cell, there was used a composition obtained by mixing three compounds having values of a number of carbon at alkyl chain between mesogens (n) of 7, 9 and 11, respectively, and having the structure 1 described in non-patent document 2, in the ratio of 1:1.15:1, respectively. As a chiral dopant, BDH1281 manufactured by Merck Ltd. was added in an amount of several percent so that the Bragg scattering center wavelength due to chiral pitch might be in the ultraviolet wavelength region. The above-mentioned material makes it possible to obtain optically isotropic liquid crystals that show optical isotropy (a cholesteric blue phase) in a wide temperature range near room temperature. The liquid crystal composition was enclosed in the cell in a vacuum and the cell was sealed with a sealer comprising an ultraviolet-setting resin to produce a liquid crystal panel. In this case, the thickness of the liquid crystal layer LC was adjusted to 10 microns when the liquid crystals were in the enclosed state. The liquid crystal material used in this case is not limited to the liquid crystal material used above. There may be used liquid crystal materials that introduce optically isotropic blue phases, for example, as described in non-patent document 5, a liquid crystal composition composed of JC1041-0XX (liquid crystal material manufactured by Chisso Co. Ltd.), 4-cyano-4'-phenylbiphenyl 5CB (liquid crystal material manufactured by Aldrich Co. Ltd.) and ZLI-4572 (chiral dopant manufactured by Merck Co. Ltd.). There may also be used media which are optically isotropic when no voltage is applied thereto but are optically anisotropic when voltage is applied.

By employing the structure described above, the decrease of the stabilization rate can be suppressed and display troubles such as flicker of transmitted light can be prevented, in a liquid crystal device structure using three-dimensionally optically isotropic liquid crystals.

[Formation of a Surface Layer Having a Periodic Structure]

Figure 4:
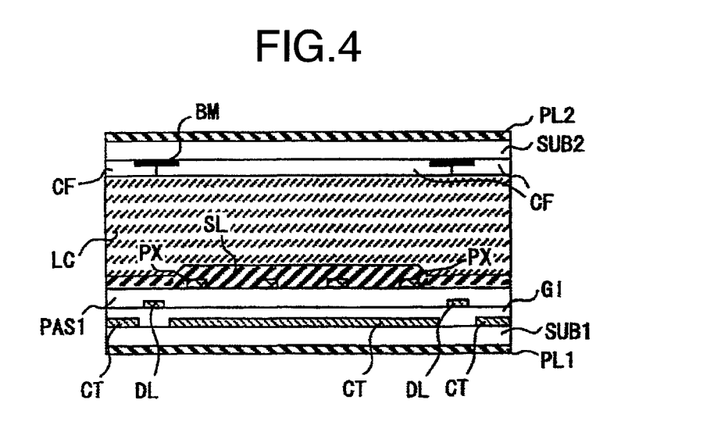
FIG. 4 is a diagram showing [the formation of a surface layer having a periodic structure] according to the present invention.

It is known that three-dimensionally optically isotropic liquid crystals have an isotropic three-dimensional periodic structure when no voltage is applied thereto. As this periodic structure, there are those having a pitch in the range of the lattice constant of a conventional crystal structure to the wavelength of visible light. This periodic structure can be said to be a crystal-like state. In the case of partial application of a strong electric field to liquid crystals having such a structure, the periodic structure is distorted, so that light leakage and a lowering of contrast are likely to be caused owing to a state like hysteresis. That is, although the electrode structure described in the above item [Basic structure of a device] permits application of a strong electric field to the optically isotropic liquid crystals, the periodic structure is distorted by the partial application of the strong electric field to a liquid crystal layer during the electric field application, so that the return of the liquid crystal layer to the optically isotropic state becomes difficult in some cases when the application of a voltage is stopped. In order to solve such a problem, the structure shown in FIG. 4 is employed in the present investigation. In FIG. 4, a liquid crystal display device is produced by the same process as in the above item [Formation of a passivation layer] except for forming a surface layer SL in place of the passivation layer PAS2 in FIG. 3.

In this case, the surface layer SL is preferably located in contact with the lower surface of a liquid crystal layer LC, as a layer having a periodic structure on its surface. It is conjectured that the distortion of the periodic structure of the optically isotropic liquid crystals becomes especially serious in a region near pixel electrodes PX in the liquid crystal layer LC. However, when the surface layer SL having a periodic structure is located as described in the present investigation, the interaction between the surface layer SL and the liquid crystal layer LC at the boundary surface between them improves the retention of the periodic structure of the optically isotropic liquid crystals, so that unsatisfactory alignment can be reduced.

As specific examples of optically isotropic phase stabilization layer SL, an alignment layer used in the case of nematic liquid crystals, and the like are thought of. In the present investigation, although the surface layer SL is formed by $SiO_2$ oblique vapor deposition, it may be formed by forming a polyimide layer and rubbing this layer. In this case, a solution of polyamic acid varnish is formed by printing on the pixel electrodes PX and baked at 220° C. for 30 minutes to form a polyimide layer of about 100 nm. Then, the polyimide layer is rubbed to form a periodic structure on the surface of the polyimide layer, whereby the surface layer SL is completed. In addition, it is also possible to form a periodic structure in the layer by light irradiation without rubbing. The surface layer SL having the periodic structure is not a layer for giving initial molecular alignment to the liquid crystal layer, unlike in the case of nematic liquid crystals. Therefore, the layer need not be located on each of the upper and lower boundary surfaces of the liquid crystal layer, and it is sufficient that the layer is formed only on a lower substrate SUB1.

Figure 5:
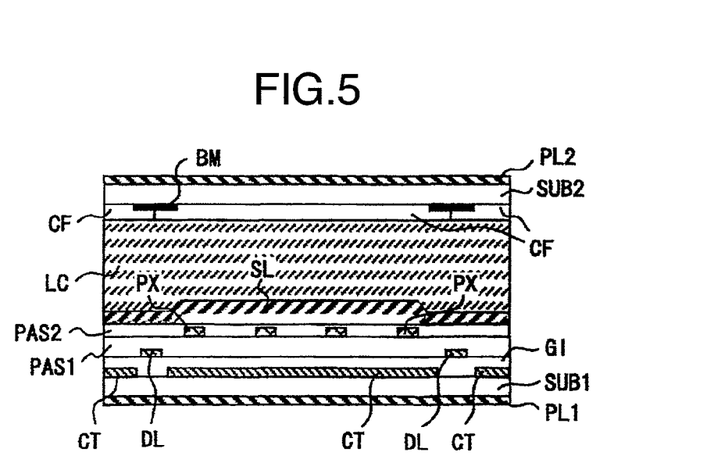
FIG. 5 is a diagram showing [the formation of another surface layer having a periodic structure] according to the present invention.
Figure 6:
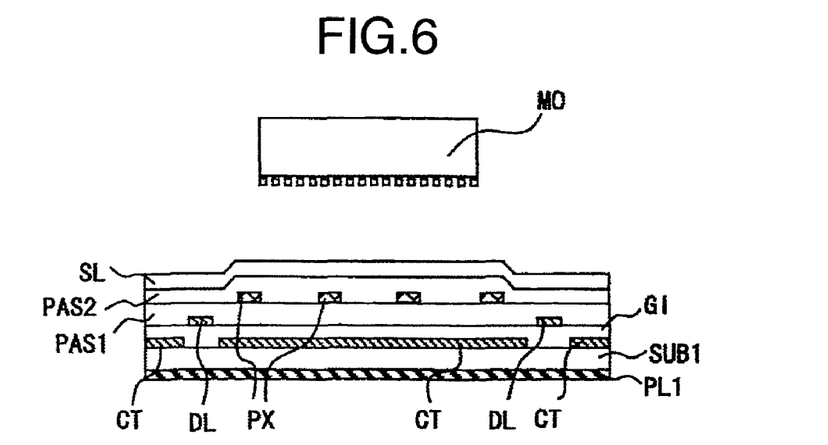
FIG. 6 is a diagram showing [the formation of a surface layer having a periodic structure] according to the present invention.
Figure 7:
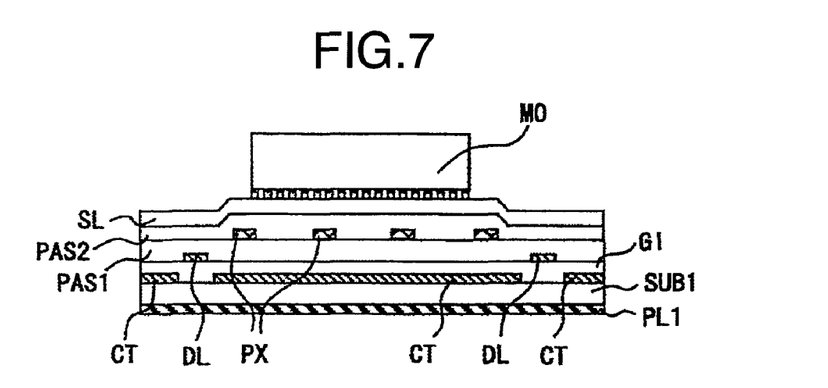
FIG. 7 is another diagram showing [the formation of the surface layer having a periodic structure] according to the present invention.
Figure 8:
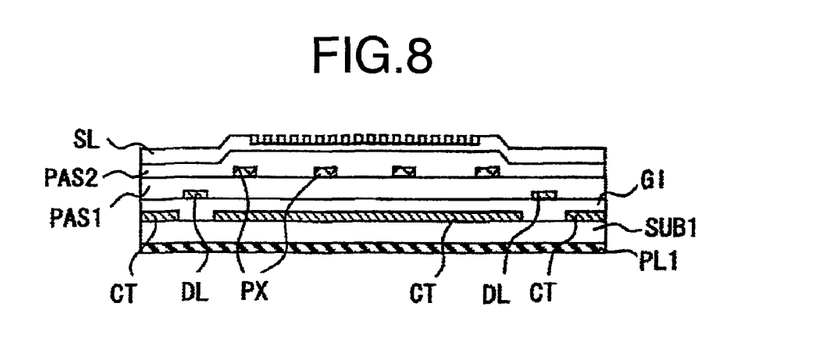
FIG. 8 is further another diagram showing [the formation of the surface layer having a periodic structure] according to the present invention.

When the structure described above is employed, the surface layer SL in contact with the lower boundary surface of the liquid crystal layer LC helps to retain the periodic structure of the optically isotropic liquid crystals, so that light leakage and a lowering of contrast can be prevented. Although the surface layer SL is formed directly on the pixel electrodes PX in FIG. 4, the surface layer SL may be formed through a passivation layer PAS2 as shown in FIG. 5.

FIGS. 6 to 10 show a structure in the case of using a thermoplastic resin PMMA in the optically isotropic phase stabilization layer SL. In this structure, the optically isotropic phase stabilization layer SL was formed by procedure shown in FIGS. 6 to 8. At first, PMMA was applied on a gate insulator GI2 provided on a substrate SUB1. Then, the PMMA was heated at 200° C. to be softened, and a mold MO separately produced by an electron beam writing technology was brought into contact with the PMMA and pressed to deform the PMMA layer. The PMMA layer was cooled in such a state and was allowed to stand until the PMMA was hardened. Thereafter, the mold MO was peeled off to form pillars (a pillar-shaped structure) with a thickness of 70 nm and a height of 200 nm on the PMMA surface, whereby the optically isotropic phase stabilization layer SL was formed.

Figure 9:
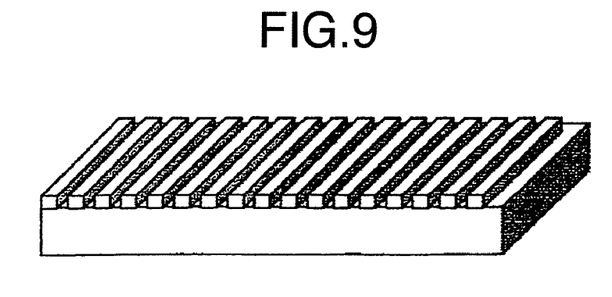
FIG. 9 is a diagram showing [the formation of a surface layer having a periodic structure] according to the present invention.
Figure 10:
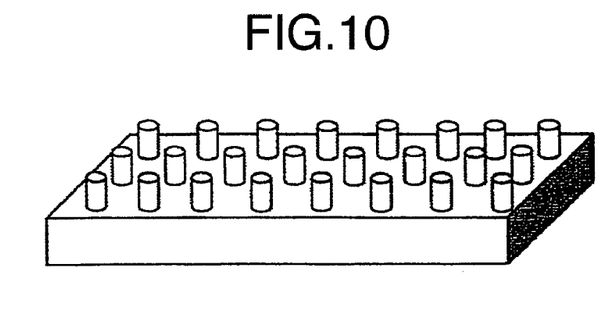
FIG. 10 is a diagram showing [the formation of a surface layer having another periodic structure] according to the present invention.

The periodic structure in the optically isotropic phase stabilization layer SL is preferably formed in the form of pillars or ribs (a wall structure) at a pitch of visible light wavelength or shorter (400 nm or shorter) in order to prevent coloring by light interference. A material for the periodic structure is not limited so long as it is a resin such as a thermoplastic resin, thermosetting resin, photo-setting resin or the like. As the periodic structure of the surface of the optically isotropic phase stabilization layer SL, there is a structure composed of concavities and convexities ranging in one direction as shown in FIG. 9, in particular, a structure composed of pillars. There is also a structure composed of columns as shown in FIG. 10. The shape of the pillar may be any of shapes such as a column, triangular pillar, square pillar, cone, triangular pyramid, quadrangular pyramid, etc. or may be hemispherical, so long as such a structure is formed while keeping a periodic order at a pitch of visible light wavelength or shorter.

[Formation of an Electrode Shape]

Figure 11:
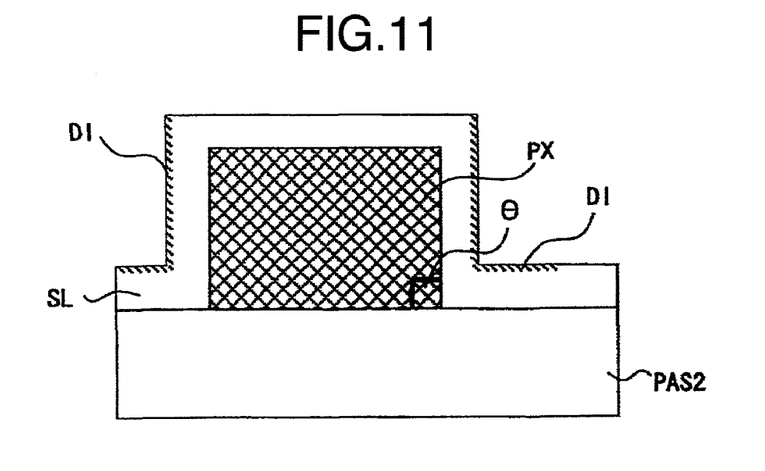
FIG. 11 is a diagram showing [the structure of an electrode form] according to the present invention.
Figure 12:
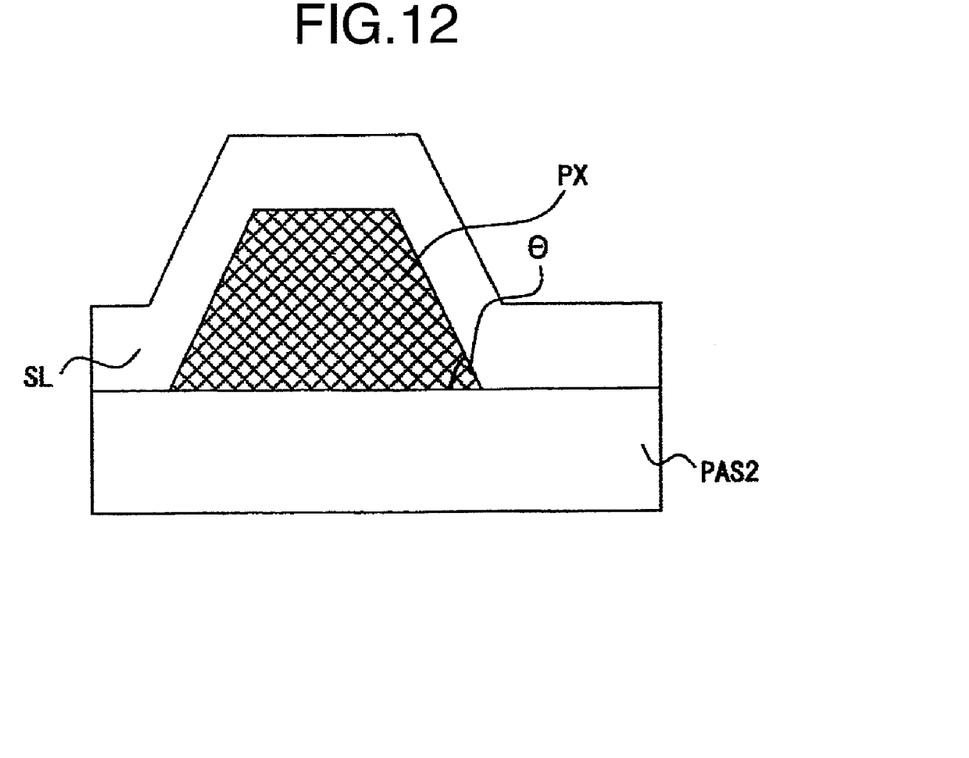
FIG. 12 is a diagram showing [the structure of another electrode form] according to the present invention.

In the above item [Formation of a surface layer having a periodic structure], rubbing or light irradiation is described as a method for imparting the periodic structure to the surface layer SL. However, when the surface layer SL is located right over the pixel electrodes PX, image sticking due to the rubbing or light irradiation has to be investigated. FIG. 11 is an enlarged view of the portions corresponding to the passivation layer PAS, pixel electrode PX and surface layer SL in FIG. 4. In this case, when the angle Θ at the corner of the pixel electrode PX is too large, the surface layer SL cannot be uniformly rubbed in its portion near the aforesaid corner, so that a defective portion DI having no periodic structure imparted thereto is formed. When the angle Θ is large, an electric field tends to be centered at a region near the corner of the pixel electrode PX and hence the role of the surface layer SL becomes especially important. Therefore, the difficulty of the return of the liquid crystal layer to the optically isotropic state is not partly diminished owing to the formation of the defective portion DI. To solve this problem, it is sufficient that the pixel electrode PX is tapered as shown in FIG. 12. That is, by decreasing the angle at the corner, the following effects can be obtained: the uniformity of rubbing is improved, and moreover, the centering of an electric field at the vicinity of the corner is lessened to reduce the partial application of a strong electric field to the optically isotropic liquid crystals. It is conjectured that such effects can be markedly obtained by adjusting the angle Θ at the corner to an angle in the range of $0°<Θ<45°$.

Figure 13:
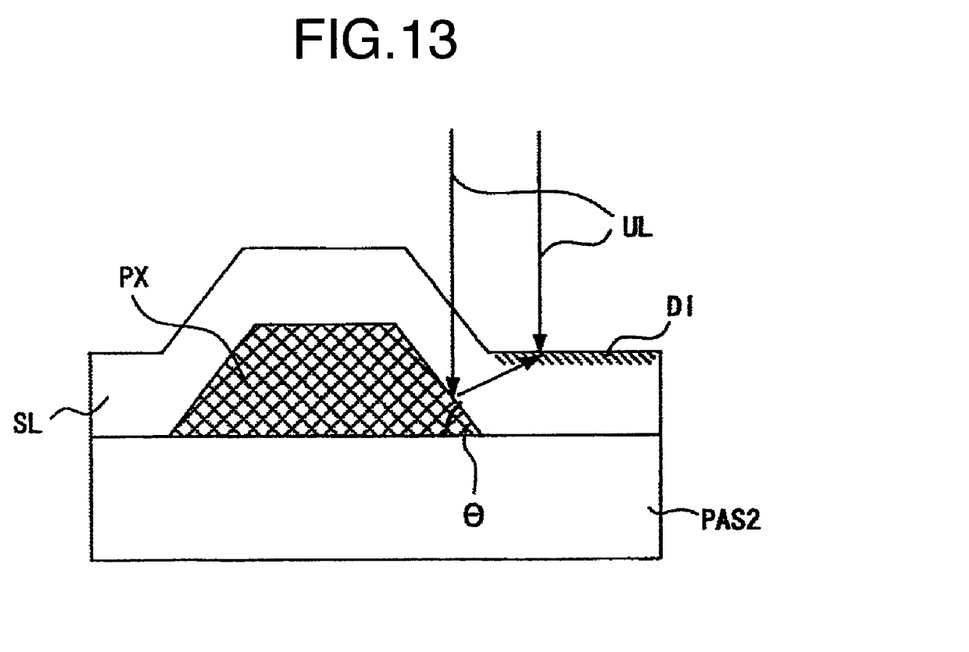
FIG. 13 is a diagram showing [the structure of further another electrode form] according to the present invention.
Figure 14:
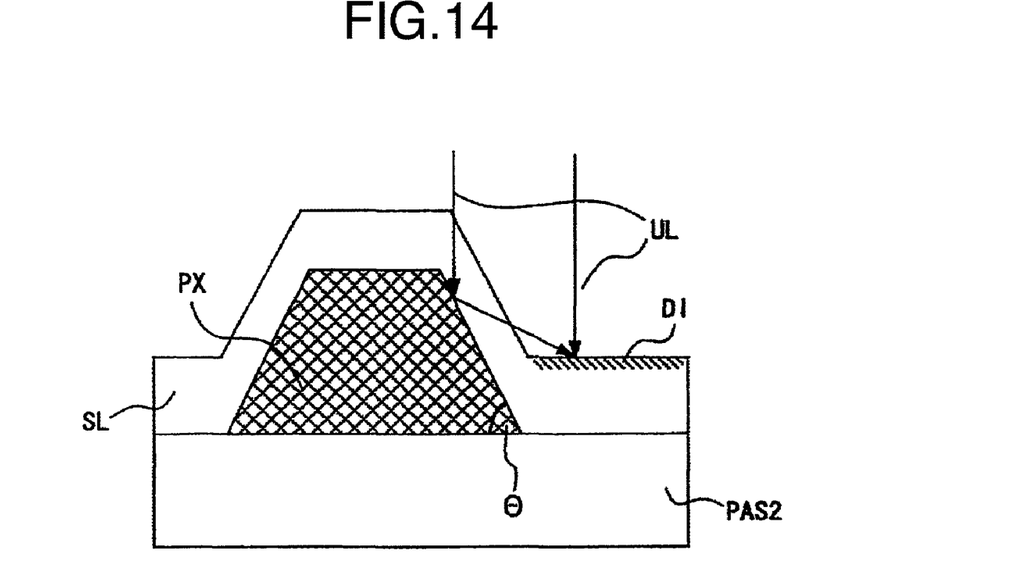
FIG. 14 is a diagram showing [the structure of still another electrode form] according to the present invention.
Figure 15:
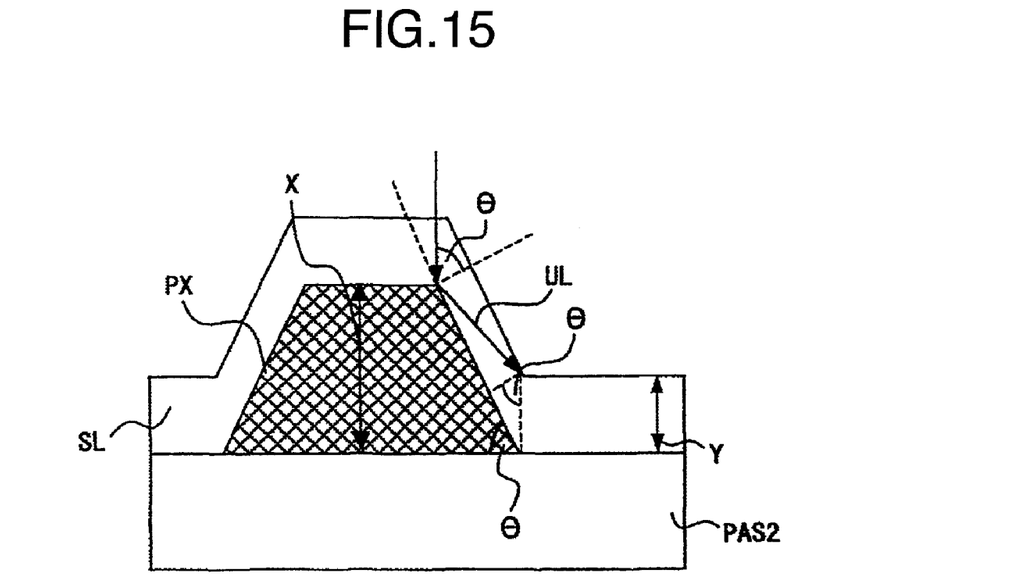
FIG. 15 is a diagram showing [the structure of still another electrode form] according to the present invention.

On the other hand, when the surface layer SL is irradiated with light, it can be speculated that as shown in FIG. 13 or FIG. 14, the irradiation light UL is reflected by the edge of the pixel electrode PX and that the surface of the optically isotropic phase stabilization layer is irradiated with the reflected light. In this case, a region irradiated with the reflected light is irradiated also with the irradiation light UL directly cast thereon, so that a defective portion DI having a disordered periodic structure is formed. To prevent such double irradiation, it is sufficient that when the angle at the corner of the pixel electrode PX is taken as Θ, the height of the pixel electrode PX as x and the thickness of the surface layer SL as y, Θ, x and y are set so as to satisfy the relationship $y>x/2 \sin^2 θ (0°<Θ<45°)$. By such setting, as shown in FIG. 15, the double irradiation due to the two patterns shown in FIG. 13 and FIG. 14 is avoided, so that the function of the optically isotropic phase stabilization layer can be improved.

[Formation of a Multi-Domain]

In this investigation, the multi-domain structure of a liquid crystal device using optically isotropic liquid crystals is explained.

Figure 16:
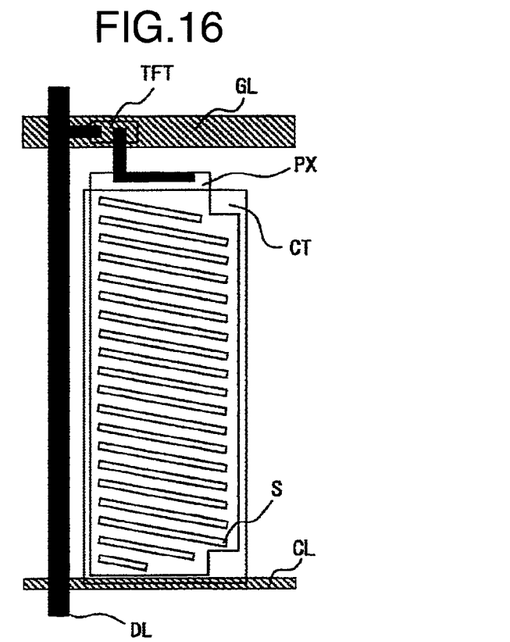
FIG. 16 is a diagram showing [the structure of a multi-domain] according to the present invention.
Figure 17:
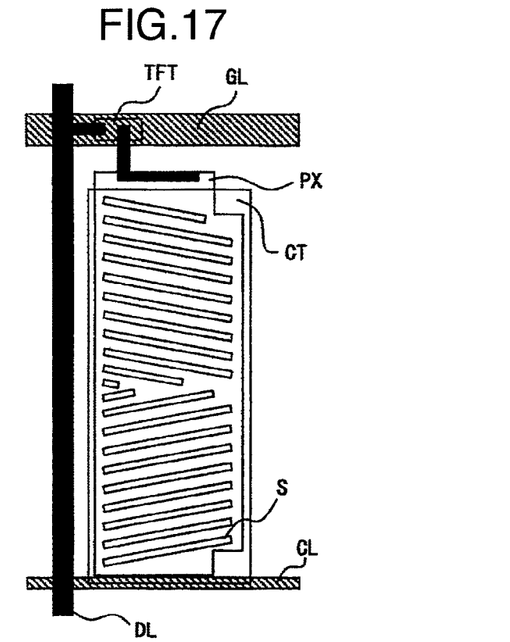
FIG. 17 is a diagram showing [the structure of another multi-domain] according to the present invention.

A uniaxial optically anisotropic medium involves the angle dependence of retardation. Therefore, even when a light display has a white color in a normal-line direction with respect to a liquid crystal display device, there is the following direction when the light display is looked at askance: a direction from which the light display looks yellow because of an increase of the retardation, or a direction from which the light display looks blue because of a decrease of the retardation. Accordingly, when the direction of an interdigital pattern formed in a pixel electrode PX in a pixel (the direction of slits S) is uniform as shown in FIG. 16, coloring is caused depending on the direction of watching. In order to improve such visual angle characteristics, there is a technique for designing pixel electrodes so that two portions (domains) different in director may be formed when a voltage is applied. When the two domains different in director are formed in a pixel at the time of application of a voltage, blue and yellow are combined to give a color inclining toward white because coloring in a visual angle direction is leveled by additive mixture of color stimuli. To form such two domains, it is sufficient that two regions different in the direction of slits S are formed as shown in FIG. 17. This is because such design permits formation of two regions different in the direction of an electric field applied between a pixel electrode PX and a common electrode CT. In this case, when the angle between the directors in the two domains, respectively, is 90°, coloring is most satisfactorily leveled, so that the dependence on view angle is broken. On the other hand, when conventional nematic liquid crystals are used, a design is adopted in which the direction of slits S is deviated from the direction of minor axis of a pixel electrode PX (the direction of minor axis of a pixel) by less than 10° in view of the influence of the initial molecular alignment of a liquid crystal layer and the direction of rotation of liquid crystal molecules. That is, the directions of slits S corresponding to the two domains are deviated from each other by less than 20°.

On the other hand, optically isotropic liquid crystals have the following property: they are three-dimensionally or two-dimensionally optically isotropic when no voltage is applied thereto, though when an electric field is applied thereto, they induce birefringence only in the direction of the application. Therefore, when a voltage is applied to the optically isotropic liquid crystals, they show optical uniaxiality, so that their transmittance becomes dependent on view angle as in the case of nematic liquid crystals. In addition, the optically isotropic liquid crystals are different from the nematic liquid crystals in that their molecules are aligned in the direction of an electric field because the optically isotropic liquid crystals are free from initial molecular alignment having optical anisotropy.

Figure 18:
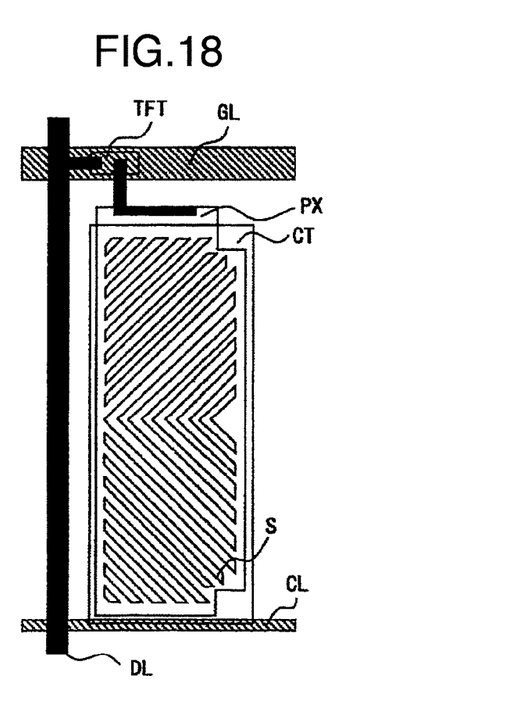
FIG. 18 is a diagram showing [the structure of further another multi-domain] according to the present invention.

The multi-domain structure, which is the most suitable for optically isotropic liquid crystals for the above reasons, is explained below with reference to FIGS. 18 to 22. FIG. 18 shows an assembly of a pixel electrode PX and a common electrode CT in a pixel. This assembly is designed so that two domains are present in the pixel and that the directions of an interdigital pattern (slits S) in the two domains, respectively, may be deviated from the direction of the minor axis of a pixel electrode PX (the direction of the minor axis of the pixel) by less than 45° and 135°, respectively. By designing the assembly so that the angle between the directions of slits S in the two domains, respectively, may be 90°, an electric field is applied between the common electrode CT and the pixel electrode PX in interdigital shape having the above-mentioned deviation of 90°. Therefore, it becomes possible to deviate the directors of optically isotropic liquid crystals in the two domain, respectively, from each other by 90°. As to a polarizing plate provided on each of the upper and lower surfaces of a liquid crystal panel, the directions of the axes of transmission of the polarizing plates, respectively, have to be perpendicular to each other and the direction of the axis of transmission of each polarizing plate has to be set at a direction deviated from the direction of slits S by 45° or 135°.

Although a minor error is caused in actual electrode design, substantially the same effect can be obtained so long as the angle between the directions of slits S in the two domains, respectively, is in the range of not more than 92° and not less than 88° (also in the case of setting other angles, substantially the same effect can be obtained so long as the above-mentioned angle is in the range of ±2°).

Figure 19:
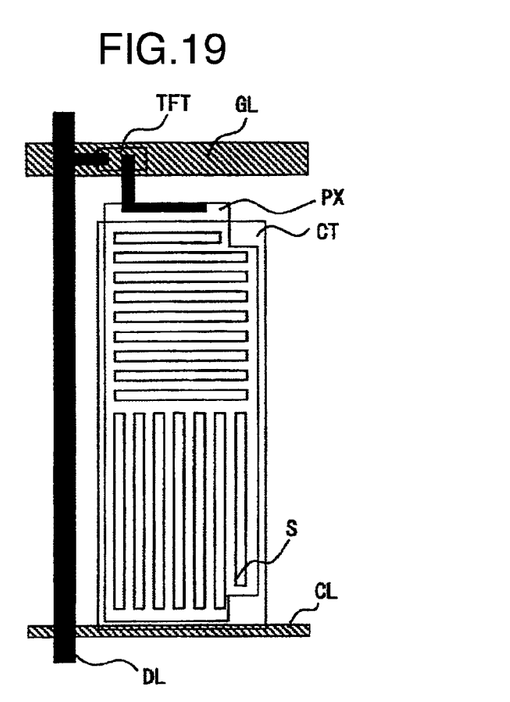
FIG. 19 is a diagram showing [the structure of still another multi-domain] according to the present invention.

On the other hand, the following problem is newly caused in the above-mentioned assembly: since the slits S are located at oblique angles of 45° or 135° in the pixel electrode PX, a sufficiently long slit S structure cannot be formed near the corner of the pixel electrode PX, so that the inside of the pixel cannot be effectively utilized. For relieving this problem, the pixel structure shown in FIG. 19 is preferable. This structure is a multi-domain structure attained by forming slits S parallel to each of the long side and short side of a pixel electrode PX or a common electrode CT in a pixel. Owing to such a structure, the angle between the directors of optically isotropic liquid crystals in the two domains, respectively, can be set at 90° and an interdigital form can be obtained which permits effective utilization of the inside of the pixel. In this structure, the directors in the two domains, respectively, make angles of 0° and 90°, respectively, with the direction of short side of the pixel electrode PX (the direction of short side of the pixel).

Figure 20:
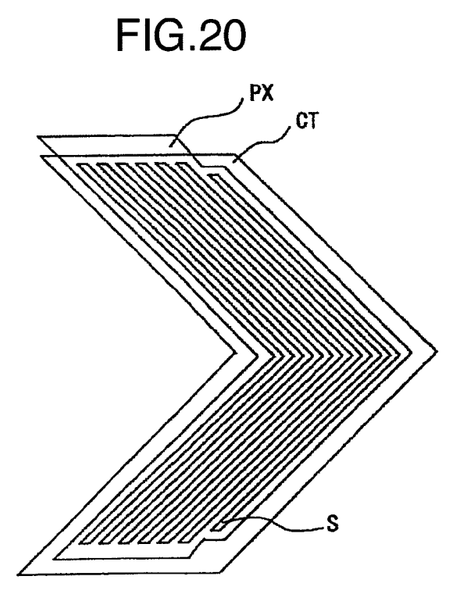
FIG. 20 is a diagram showing [the structure of still another multi-domain] according to the present invention.
Figure 21:
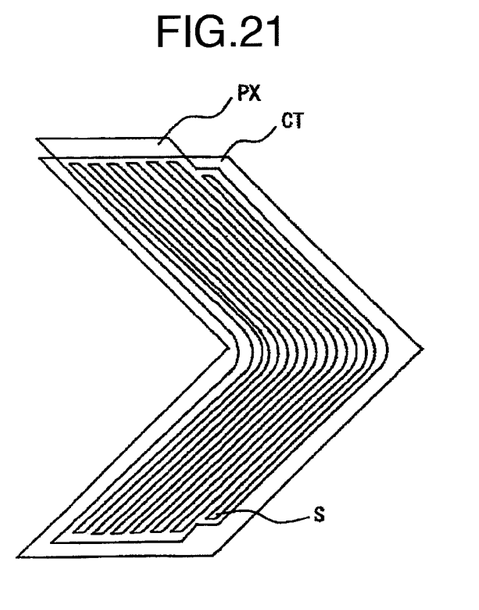
FIG. 21 is a diagram showing [the structure of still another multi-domain] according to the present invention.

In addition, the pixel structure shown in FIG. 20 is thought of as a modification of the structure shown in FIG. 18 or FIG. 19. In FIG. 20, a pixel electrode PX itself has a bent shape, i.e., V-shape, which corresponds to the shape of slits S formed at angles of 45° and 135°. By employing such a shape of the pixel electrode PX, the inside of a pixel can be effectively utilized without forming a region having short slits S, as compared with the structure shown in FIG. 18. Moreover, the structure shown in FIG. 20 is advantageous in that the number of the ends of slits S in the pixel electrode PX can be reduced as compared with the structure shown in FIG. 19. Since a uniform transverse electric field is not formed at the ends of slits S, an alignment component parallel to the axis of absorption of a polarizing plate arises, so that an alignment change cannot be utilized as a transmittance change, resulting in a lowered transmittance. Therefore, it becomes possible to improve the transmittance by the use of the structure having a reduced number of the ends of slits S which have undesirable influences. In the structure shown in FIG. 21, the bent portion of a pixel electrode PX and the slits S has a curved shape. From properties of optically isotropic liquid crystals, it is conjectured that they behave like an elastomer. Therefore, if the director changes discontinuously at the boundary between the two domain, disclination is liable to be caused. In FIG. 21, in order to suppress the occurrence of this disclination, the V-shaped bent portion of the pixel electrode PX and the slits S is given a continuously curved shape, whereby it becomes possible to make the change of the director continuous. In the structures shown in FIG. 20 and FIG. 21, a common electrode CT is also given a V-like bent shape because the pixel electrode PX is given a V-like bent shape. However, in a structure in which separate common electrodes are not provided in pixels, respectively, for example, in the case of a medium- or small-sized liquid crystal display device, a common electrode has no bent structure. In the structure shown in FIG. 21, the efficiency can be further improved by giving a curved shape also to the V-shaped bent portion of the common electrode CT.

Figure 22:
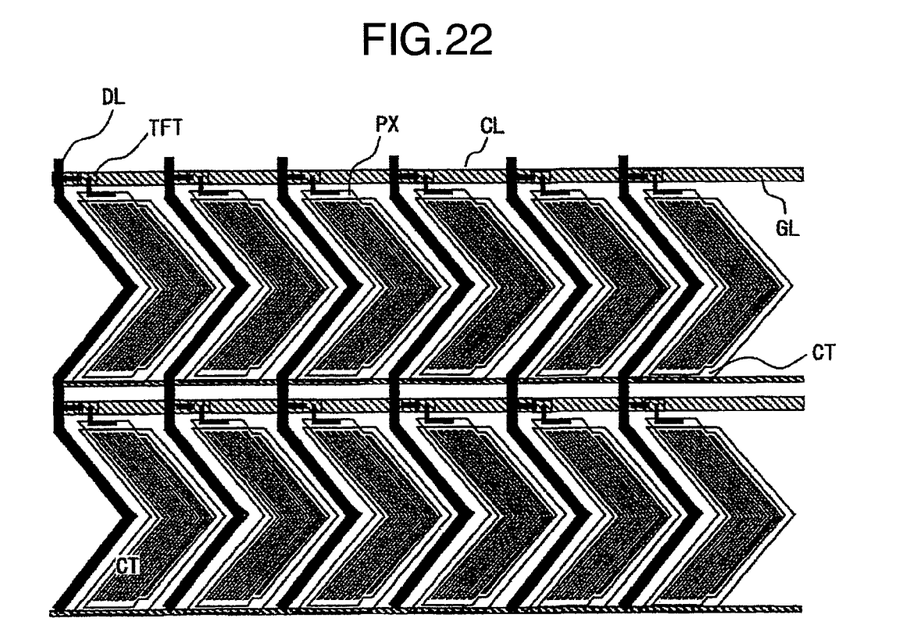
FIG. 22 is a diagram showing [the organization of multi-domains] according to the present invention.

FIG. 22 shows the organization of a group of pixels in a display device in the case of using the electrode structure shown in FIG. 20 or FIG. 21. An image signal transmitted by an image signal line DL is supplied to a pixel electrode PX through a thin-film transistor TFT controlled by a gate signal line GL. A display is given by forming an electric field between the pixel electrode PX and a common electrode CT to drive a liquid crystal layer. In this case, since the pixel electrode PX and the common electrode CT have a V-like bent shape given by processing, the image signal line DL is also preferably given a bent shape so as to conform to the pixel electrode PX and the common electrode CT. When such a shape is given, it becomes possible to attain a display element free from a space between pixels.

[Production of a Liquid Crystal Material]

In this investigation, there are explained the production of an optically isotropic liquid crystal material highly adaptable to a liquid crystal device, and a device structure using this material.

Of optically isotropic liquid crystal materials, polymer stabilization type blue phases are known as materials that are three-dimensionally optically isotropic when no voltage is applied thereto. As the polymer stabilization type blue phases, there are known materials obtained as follows: a non-liquid-crystal monomer(s) represented by any of the chemical formulas 1 to 3, a liquid crystal monomer represented by the chemical formula 4, a crosslinking agent represented by the chemical formula 5 and a photopolymerization initiator represented by the chemical formula 6 are irradiated with ultraviolet light (UV) to effect photo-crosslinking, whereby final optically isotropic liquid crystals are obtained.

and/or

Chemical formula 1

Chemical formula 2

Chemical formula 3

Chemical formula 4

Chemical formula 5

Chemical formula 6

Figure 23:
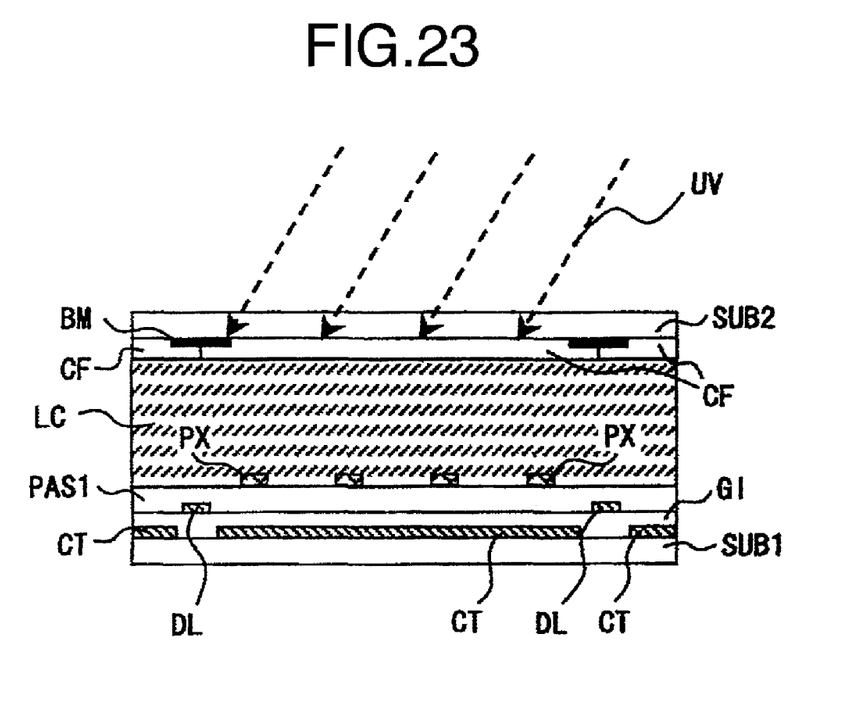
FIG. 23 is a diagram showing [the formation of a liquid crystal material] according to the present invention.

However, a problem is caused when such a liquid crystal material is used in a liquid crystal device. FIG. 23 shows a display element obtained by mixing the materials of the above chemical formulas 1 to 6 and enclosing the mixture in a liquid crystal cell. A liquid crystal layer LC is located between a substrate SUB2 having color filters CF and a substrate SUB1 having common electrodes CT and pixel electrodes PX. In this case, in order to subject the liquid crystal layer LC to photo-crosslinking, irradiation with ultraviolet light UV from the substrate SUB1 or SUB2 side is necessary, but the following problem is caused: since the ultraviolet light UV is not transmitted by the color filters CF and the like, the ultraviolet light UV does not reach the liquid crystal layer LC in the whole or a part of the liquid crystal cell.

In order to solve this problem, the following production of an optically isotropic liquid crystal material is thought of.

In this investigation, an optically isotropic liquid crystal material represented by the chemical formulas 12 to 16 is obtained by heat-crosslinking by using a non-liquid-crystal monomer(s) represented by any of the chemical formulas 7 to 9, a liquid crystal monomer represented by the chemical formula 10 and an epoxy type heat-crosslinking agent represented by the chemical formula 11.

Chemical formula 7 and or

Chemical formula 8 and or

Chemical formula 9

Chemical formula 10

Chemical formula 11 n = 1 ~ 3

Chemical formula 12

Chemical formula 13 and or

Chemical formula 14 and or

Chemical formula 15

Chemical formula 16 wherein
R''=an alkyl straight chain of 2 to 10 carbon atoms or a methoxy group having an alkyl straight chain of 2 to 10 carbon atoms, X any of a hydrogen atom, a fluorine atom, a methyl group, an ethyl group, a cyano group, a methoxy group, an acetyl group and a carboxylic acid group, or a mixture thereof, and/or $R'=C_mH_{(2m+1)}$ in which m=5 to 10.

At first, the compound(s) represented by any of the chemical formulas 7 to 9 and the compound represented by the chemical formula 10 are mixed and then enclosed in a liquid crystal cell, after which the heat-crosslinking agent represented by the chemical formula 11 is enclosed therein. Subsequently, the compounds enclosed are heated at about 50° C. for 2 hours to effect heat-crosslinking, whereby the compound represented by the chemical formulas 12 to 16 can be obtained. By adopting the above production process, the optically isotropic liquid crystal material can be produced without light irradiation and can be made into a liquid crystal device structure of great utility.

Figure 24:
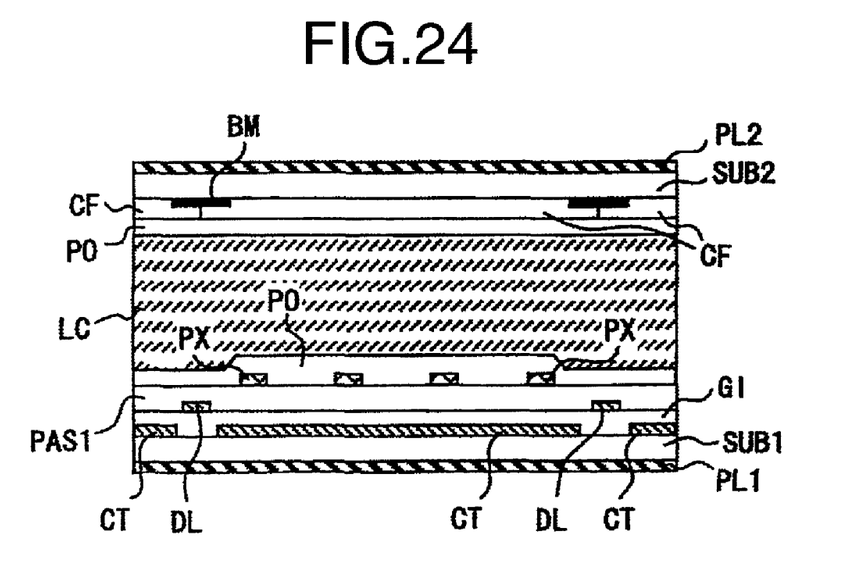
FIG. 24 is a diagram showing [the formation of another liquid crystal material] according to the present invention.

In addition, when a heat-crosslinked liquid crystal material is used as in the present investigation, heat-crosslinked molecules are firmly anchored onto substrates holding the liquid crystal material between them, by forming a thin film of a polyimide resin on the substrates, whereby a liquid crystal device can be produced in which image sticking is reduced. Such a structure is shown in FIG. 24. The structure shown in FIG. 24 is the same as the structure shown in FIG. 23 in that a liquid crystal layer LC is located between a substrate SUB2 having color filters CF and a substrate having common electrodes CT and pixel electrodes PX. But, the former is different from the latter in that a polyimide resin thin film PO is located on the contact surface between the liquid crystal layer LC and each of the upper and lower substrates.

By employing such a structure, there can be obtained an effect of reducing image sticking and display nonuniformity due to afterimage.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A liquid crystal display device comprising
a first substrate and a second substrate;
polarizing plates provided on the first substrate and the second substrate, respectively;
a liquid crystal layer located between the first substrate and the second substrate; and
pixel electrodes and common electrodes provided on the first substrate,
wherein:
the liquid crystal layer has such a property that optical anisotropy is induced therein by a change of an optically isotropic state caused by application of a voltage;
the pixel electrodes or the common electrodes are formed in an interdigital form;
a surface layer is formed directly on interdigitally formed pixel electrodes, each interdigitally formed pixel electrode having side walls tapered from a top to a bottom with a taper angle $\theta$ in the range of $0°<\theta<45°$;
an electric field is applied to the liquid crystal layer by a potential difference applied between the pixel electrodes and the common electrodes, and
the surface layer is located in contact with a surface of the liquid crystal layer and the surface layer has a periodic structure of 400 nm or less in size, and
the surface layer is formed on the first substrate only and is not formed on the second substrate.

2. A liquid crystal display device according to claim 1, wherein the first substrate includes a plurality of pixels located thereon in the form of a matrix, and each of the plurality of pixels comprises a pixel electrode, a common electrode and a thin-film transistor.

3. A liquid crystal display device according to claim 2, wherein:
the pixel electrodes are formed in the form of an interdigital pattern;
the common electrodes are formed in the form of a flat plate; and
the pixel electrodes are arranged in at least two interdigital patterns, which are different in direction by not more than 92° and not less than 88°, in each of the plurality of said pixels.

4. A liquid crystal display device according to claim 1, wherein the first substrate includes a passivation layer located between the interdigitally formed pixel electrodes and common electrodes located on the first substrate.

5. A liquid crystal display device according to claim 1, wherein said liquid crystal layer is obtained by thermal polymerization.

6. A liquid crystal display device according to claim 1, wherein the surface layer is formed by rubbing.

7. A liquid crystal display device according to claim 1, wherein a periodic structure in the surface layer is formed by light irradiation.

8. A liquid crystal display device according to claim 1, wherein:
the liquid crystal display device further comprises an image signal line, and
a periodic structure is formed at only a side at which the pixel electrodes exist from the image signal line.

9. A liquid crystal display device according to claim 8, wherein the periodic structure is formed in only a region adjacent the pixel electrodes.

10. A liquid crystal display device according to claim 1, wherein:
the surface layer includes a portion having a first film thickness and a portion having a second film thickness which is thinner than the first film thickness,
the pixel electrodes are formed in only the portion having a first film thickness, and
the periodic structure is formed in only the portion having a first film thickness.

11. A liquid crystal display device according to claim 1, wherein the periodic structure is in the form of pillar.

* * * * *